(12) United States Patent
Anastasia et al.

(10) Patent No.: US 10,710,554 B2
(45) Date of Patent: Jul. 14, 2020

(54) TELEMATICS DEVICE AND METHOD FOR TAKING OUT VEHICLE INSURANCE AND ESTIMATING INSURANCE FEES

(71) Applicants: Hyundai Motor Company, Seoul (KR); Kia Motors Corporation, Seoul (KR)

(72) Inventors: Yarygina Anastasia, Seoul (KR); Jimin Han, Gyeonggi-do (KR); Jung Mi Park, Gyeonggi-do (KR); Jia Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 208 days.

(21) Appl. No.: 16/113,300

(22) Filed: Aug. 27, 2018

(65) Prior Publication Data

US 2019/0366980 A1    Dec. 5, 2019

(30) Foreign Application Priority Data

May 31, 2018    (KR) .................... 10-2018-0062780

(51) Int. Cl.
*B60R 25/31*   (2013.01)
*B60R 25/04*   (2013.01)
(Continued)

(52) U.S. Cl.
CPC ............ *B60R 25/241* (2013.01); *B60R 25/04* (2013.01); *B60R 25/25* (2013.01); *B60R 25/31* (2013.01);
(Continued)

(58) Field of Classification Search
CPC ....... B60R 25/241; B60R 25/25; B60R 25/31; B60R 25/04; B60R 2025/0405; G01C 21/3688; G01C 21/3484; G06Q 40/08
See application file for complete search history.

(56) References Cited

U.S. PATENT DOCUMENTS 6,526,386 B1    2/2003  Chapman et al.
8,170,892 B1    5/2012  Otis et al.
(Continued)

FOREIGN PATENT DOCUMENTS

EP          2936415 A1      10/2015
WO          0152136 A1      7/2001
WO       2014059208 A2      4/2014

*Primary Examiner* — Nga X Nguyen
(74) *Attorney, Agent, or Firm* — Mintz Levin Cohn Ferris Glovsky and Popeo, P.C.; Peter F. Corless

(57) ABSTRACT

A method operating a telematics device of a vehicle can include: requesting identity (ID) information of a driver from a driver terminal when the driver enters the vehicle; performing an authentication process using the ID information; preventing start-up of an engine of the vehicle when the driver is identified as a temporary user according to the authentication process; receiving navigation data including information relating to a destination from the driver terminal; acquiring information indicating an estimated insurance fee corresponding to each of one or more paths for navigating to the destination; transmitting the information indicating the estimated insurance fee to the driver terminal; and starting the engine when one of the one or more paths for navigating to the destination is selected by the driver terminal.

20 Claims, 9 Drawing Sheets

(51) Int. Cl.
*B60R 25/25* (2013.01)
*G01C 21/34* (2006.01)
*G01C 21/36* (2006.01)
*G06Q 40/08* (2012.01)
*B60R 25/24* (2013.01)

(52) U.S. Cl.
CPC ..... *G01C 21/3484* (2013.01); *G01C 21/3688* (2013.01); *G06Q 40/08* (2013.01); *B60R 2025/0405* (2013.01)

(56) References Cited

U.S. PATENT DOCUMENTS

| | | |
|---|---|---|
| 2003/0108227 A1 | 6/2003 | Philomin et al. |
| 2004/0039611 A1 | 2/2004 | Hong et al. |
| 2005/0071202 A1 | 3/2005 | Kendrick |
| 2007/0282638 A1 | 12/2007 | Surovy |
| 2010/0010836 A1 | 1/2010 | Rosen et al. |
| 2011/0112969 A1 | 5/2011 | Zaid et al. |
| 2013/0325521 A1 | 12/2013 | Jameel et al. |
| 2014/0067434 A1 | 3/2014 | Bourne et al. |
| 2015/0127210 A1* | 5/2015 | Suzuki ............... G01C 21/3664 701/29.1 |
| 2017/0039656 A1 | 2/2017 | Drennan, III |
| 2017/0132927 A1 | 5/2017 | Zlojutro |

* cited by examiner

TELEMATICS DEVICE AND METHOD FOR TAKING OUT VEHICLE INSURANCE AND ESTIMATING INSURANCE FEES

CROSS-REFERENCE TO RELATED APPLICATION

This application claims the benefit of priority to Korean Patent Application No. 10-2018-0062780, filed on May 31, 2018 in the Korean Intellectual Property Office, the disclosure of which is incorporated herein in its entirety by reference.

TECHNICAL FIELD

The present disclosure relates to vehicular technologies and, more particularly, to a telematics system and a method for taking out vehicle insurance for a temporary user and estimating an insurance fee.

BACKGROUND

As the vehicle industry develops, telematics systems that use wireless communication technology to provide various mobile communication services in vehicles are being continuously developed to provide enhanced convenience to drivers. Telematics systems may provide various services relating to, for instance, news, stock investment, electronic commerce, financial transactions, hotel reservations, document transmission/reception, games, vehicle accident reports, theft reports, and the like.

In order to protect their vehicle, many drivers take out vehicle insurance. The vehicle insurance fee may be determined by factors such as a type of vehicle, driving experience, and the like. Pay-per-mile (PPI) insurance may use the distance traveled by the driver as a factor to determine the vehicle insurance fee.

When a user of a vehicle is not an owner or regular user of the vehicle (i.e., a "temporary user"), the temporary user may need to take out vehicle insurance. However, it can be difficult to estimate a reasonable insurance fee for the temporary user. In addition, it may be cumbersome for a user to take out insurance for temporary use. Thus, the temporary user may resort to traveling without insurance to avoid trouble.

SUMMARY

The present disclosure has been made to solve the above-mentioned problems occurring in the related art while advantages achieved by the related art are maintained intact.

An aspect of the present disclosure provides methods and devices for estimating a reasonable insurance fee using a telematics system, facilitating insurance, and preventing an uninsured driver from driving a vehicle.

The technical problems to be solved by the present inventive concept are not limited to the aforementioned problems, and any other technical problems not mentioned herein will be clearly understood from the following description by those skilled in the art to which the present disclosure pertains.

According to embodiments of the present disclosure, a method of operating a telematics device of a vehicle can include: requesting identity (ID) information of a driver from a driver terminal in communication with the telematics device when the driver enters the vehicle; performing an authentication process using the ID information; controlling operation of the vehicle such that start-up of an engine of the vehicle is prevented when the driver is identified as a temporary user according to the authentication process; receiving navigation data including information relating to a destination from the driver terminal; acquiring information indicating an estimated insurance fee corresponding to each of one or more paths for navigating to the destination, wherein the estimated insurance fee is calculated based on the navigation data, external environment data, and driver data; transmitting the information indicating the estimated insurance fee to the driver terminal; and controlling operation of the vehicle such that the engine is started when one of the one or more paths for navigating to the destination is selected by the driver terminal.

The requesting of the ID information may include detecting whether a door of the vehicle is closed, a hand of the driver touches a steering wheel of the vehicle, or a start button of the vehicle is pressed; and requesting the ID information upon detecting that the door of the vehicle is closed, the hand of the driver touches the steering wheel of the vehicle, or the start button of the vehicle is pressed.

The driver terminal may include at least one of a terminal installed in the vehicle and a mobile terminal of the driver.

The method may further include receiving the ID information from the driver terminal, wherein the ID information may include at least one of fingerprint information of the driver, facial information of the driver, and voice information of the driver.

The method may further include performing a process of registering the driver using a registration form and the ID information when the driver is unidentified according to the authentication process.

The method may further include when the unidentified driver is registered, identifying the registered driver as the temporary user.

The method may further include controlling operation of the vehicle such that the engine starts when the driver is identified as a regular user according to the authentication process.

The method may further include requesting the navigation data from the driver terminal after preventing the start-up of the engine.

The acquiring of the information indicating the estimated insurance fee may include transmitting the navigation data to an external server, transmitting data associated with a previously completed trip of the driver to the external server, and receiving the information indicating the estimated insurance fee from the external server. The information indicating the estimated insurance fee may be calculated based on the navigation data, the external environment data, the driver data, and based further on the data associated with the previously completed trip of the driver.

The driver data may include vehicle data associated with at least one of a temperature, a voltage, a discharge current, a charge current, and acceleration/braking efficiency.

The driver data may include data relating to at least one of an age, a driving experience, a driving experience in each of the one or more paths for navigating to the destination, and a driving experience in vehicles of the same type as the vehicle.

The external environment data may include information relating to at least one of weather and traffic volume.

The method may further include when a trip corresponding to the selected path is completed, transmitting data associated with the trip to an external server, receiving an invoice including insurance fee information for the trip from the external server, and transmitting the invoice to the driver terminal.

The method may further include receiving a notification of generation of a report including the insurance fee information from the external server; and transmitting a message indicating that the report has been prepared to the driver terminal.

The report may be accessible using a telematics system profile.

Furthermore, according to embodiments of the present disclosure, a telematics device of a vehicle can include: a communication circuit configured to communicate with a driver terminal and an external server; a memory configured to store program instructions; and a processor electrically connected to the communication circuit and the memory, the processor configured to execute the stored program instructions, which when executed can cause the processor to request identity (ID) information of a driver from the driver terminal when the driver enters the vehicle, perform an authentication process using the ID information, control operation of the vehicle such that start-up of an engine of the vehicle is prevented when the driver is identified as a temporary user according to the authentication process, receive navigation data including information relating to a destination from the driver terminal, acquire information indicating an estimated insurance fee corresponding to each of one or more paths for navigating to the destination, wherein the estimated insurance fee is calculated based on the navigation data, external environment data, and driver data, transmit the information indicating the estimated insurance fee to the driver terminal, and control operation of the vehicle such that the engine is started when one of the one or more paths for navigating to the destination is selected by the driver terminal.

The processor may detect whether a door of the vehicle is closed, a hand of the driver touches a steering wheel of the vehicle, or a start button of the vehicle is pressed, and request the ID information upon detecting that the door of the vehicle is closed, the hand of the driver touches the steering wheel of the vehicle, or the start button of the vehicle is pressed.

The processor may perform a process of registering the driver using a registration form and the ID information when the driver is unidentified according to the authentication process, and when the unidentified driver is registered, identify the registered driver as the temporary user.

The processor may transmit the navigation data to an external server, transmit data associated with a previously completed trip of the driver to the external server, and receive the estimated insurance fee from the external server. The estimated insurance fee may be calculated based on the navigation data, the external environment data, the driver data, and the data associated with the previously completed trip of the driver.

The external server may include at least one of an authentication server, a vehicle control and data storage server, an external data processing server, a risk analysis server, and an insurance company server.

BRIEF DESCRIPTION OF THE DRAWINGS

The above and other objects, features and advantages of the present disclosure will be more apparent from the following detailed description taken in conjunction with the accompanying drawings.

Figure 1:
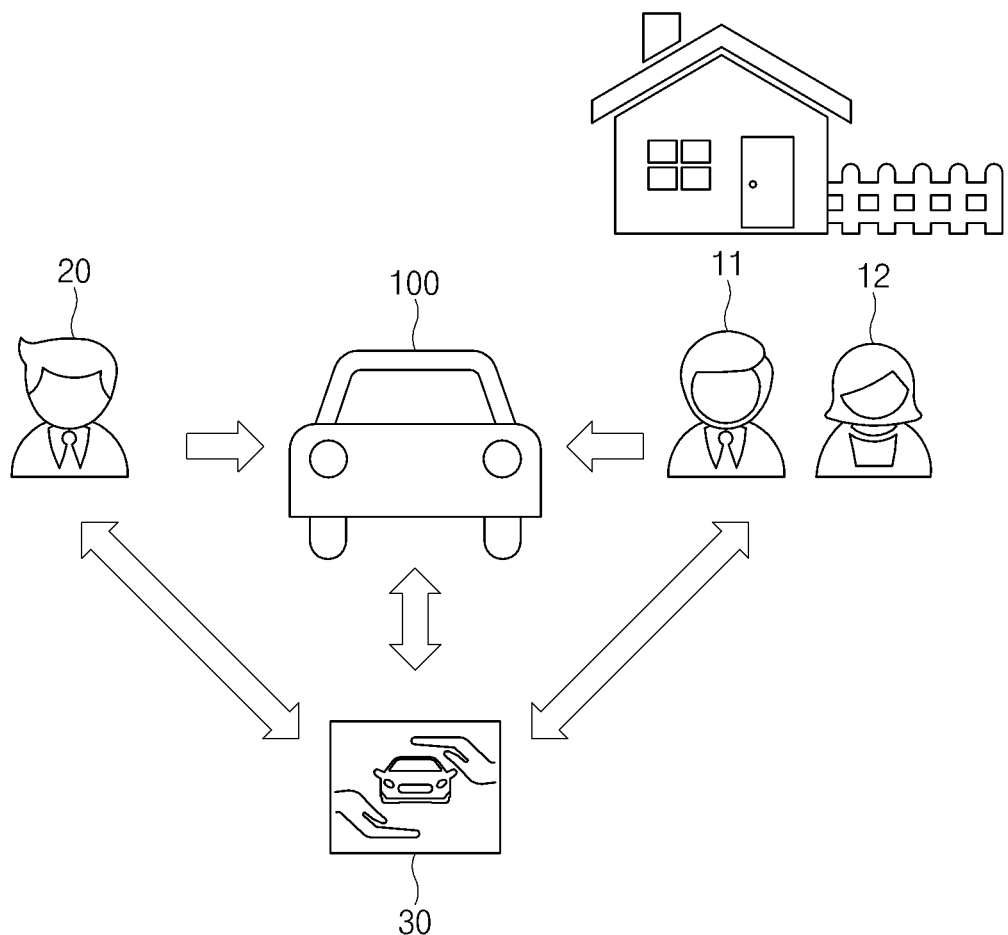
FIG. 1 illustrates an operating environment of a telematics device according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, and orders of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to the presently disclosed embodiments, FIG. 1 illustrates an operating environment of a telematics device according to embodiments of the present disclosure.

As shown in FIG. 1, first and second users 11 and 12 may be insured for pay-for-mile (PPI) insurance through an insurance company 30 as an owner or a regular user of a vehicle 100. When the first or second user 11 or 12 is boarded, the vehicle 100 may confirm that the first or second user 11 or 12 is a regular user insured through a telematics system or device. The telematics system may allow the engine to start when it is confirmed that the on-board user is insured. The insurance fee may be estimated and accumulated based on information about the on-board user and mileage.

A third user 20 may be an uninsured temporary user. When the third user 20 is boarded, the vehicle 100 may confirm that the third user 20 is an uninsured temporary user through the telematics system. When it is confirmed that the on-board user is a temporary user who is uninsured, the telematics system may block the start-up of the engine. The telematics system may perform a process of insuring and may provide an estimated insurance fee for a planned trip for the third user 20. When the trip of the third user 20 is completed, an insurance bill may be issued. If the trip of the third user 20 is extended beyond the plan, an additional fee may be charged. The services provided by the telematics system will be described in detail below.

Figure 2:
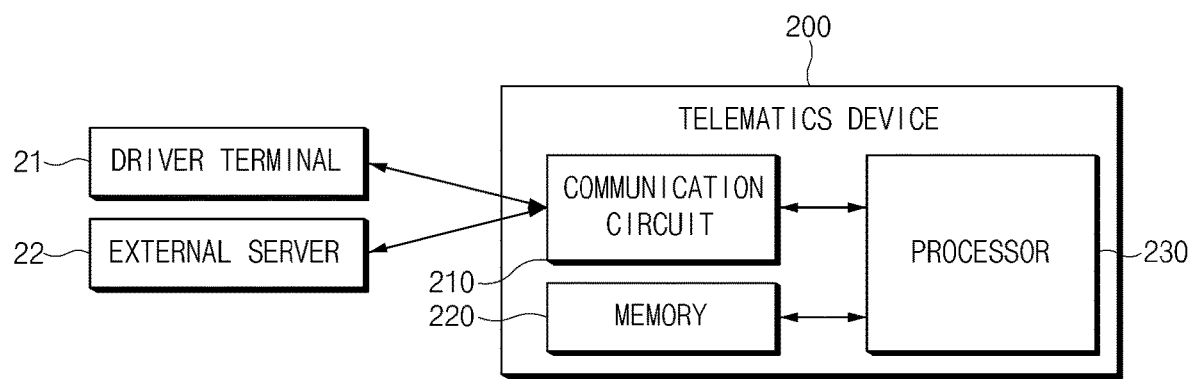
FIG. 2 is a block diagram illustrating a configuration of a telematics device according to embodiments of the present disclosure.

FIG. 2 is a block diagram illustrating a configuration of a telematics device according to embodiments of the present disclosure.

As shown in FIG. 2, a telematics device 200 according to embodiments of the present disclosure may include a communication circuit 210, a memory 220, and a processor 230. The telematics device 200 may be a server for providing a telematics service. In the present disclosure, the telematics system may refer to the telematics device 200 and may refer to a system that includes the telematics device 200, a driver terminal 21, and an external server 22.

The communication circuit 210 may be configured to communicate with the driver terminal 21 and the external server 22. For example, the communication circuit 210 may communicate with the driver terminal 21 such as a terminal installed to a vehicle or a mobile terminal or may communicate with the external server 22 that includes at least a part of an authentication server, a vehicle control and data storage server, an external data processing server, a risk analysis server, and an insurance company server. The communication circuit 210 may perform communications in various schemes such as cellular communication (e.g., LTE), Wi-Fi, Bluetooth, ZigBee, NFC, or the like.

The memory 220 may include a volatile memory and/or a non-volatile memory. The memory 220 may store various instructions executed by the processor 230 and may store various data temporarily or non-temporarily.

The processor 230 may be electrically connected to the communication circuit 210 and the memory 220. The processor 230 may control the communication circuit 210 and the memory 220 and may perform various data processing and operations.

According to embodiments of the present disclosure, the processor 230 may request information about identity (ID) of a driver from the driver terminal 21 when it is recognized that the driver gets in the vehicle interworking with the telematics system. When the door of the vehicle is closed, a hand of the driver touches a steering wheel of the vehicle, or a start button of the vehicle is pressed after the driver boards the vehicle, the processor 230 may request the ID information of the driver from the driver terminal 21.

Furthermore, the processor 230 may receive the ID information from the driver terminal 21. For example, the processor 230 may receive the ID information including fingerprint information, facial information, and/or voice information of the driver input to the driver terminal 21 by the driver.

The processor 230 may perform an authentication process using the ID information. The processor 230 may transmit the ID information to the external server 22 (e.g., an authentication server), and may receive an authentication result from the external server 22. The authentication server may perform authentication by comparing the ID information stored in a database with the received ID information. By the authentication process, the identity of the driver may be classified as an unidentified user who is not registered in the authentication server, a temporary user who is registered in the authentication server but is not insured, or a regular user who is insured.

Furthermore, when the driver is identified as a temporary user by the authentication process, the processor 230 may control operation of the vehicle such that start-up of the engine of the vehicle is prevented (or blocked). When an uninsured temporary user desires to drive the vehicle, the processor 230 may control the vehicle to prevent the engine from starting.

According to embodiments of the present disclosure, when the driver is unidentified by the authentication process, the processor 230 may perform a registration process for registering the driver using a registration form and the ID information. The processor 230 may provide the registration form for registering the driver in the authentication server through the driver terminal 21 and may receive user information corresponding to the registration form from the driver terminal 21. The processor 230 may provide the user information and the ID information to the authentication server and the authentication server may register the unidentified driver. When the unidentified driver is registered, the processor 230 may treat the registered driver as a temporary user.

Furthermore, when the driver is identified through the authentication process as a regular user, the processor 230 may control the vehicle to start the engine. When the insured regular user desires to drive the vehicle, the processor 230 may control the vehicle to start the engine.

When the authentication process and/or the registration process are/is completed, the processor 230 may request navigation data from the driver terminal 21. The processor 230 may receive the navigation data including information about a destination from the driver terminal 21. The navigation data may include information about one or more paths for navigating from a current location of the vehicle to the destination.

According to embodiments of the present disclosure, the processor 230 may obtain the information about the estimated insurance fee corresponding to each of the one or more paths associated with the destination. The estimated insurance fee may be calculated based on the navigation data, the external environment data, and the driver data.

In detail, the processor 230 may transmit the navigation data to the external server 22 (e.g., the external data processing server). The external data processing server may analyze real-time information (e.g., traffic volume, weather, and the like) about each of the one or more paths to reach the destination. The external data processing server may transmit the data to the risk analysis server. The risk analysis server may estimate the insurance fee for each of the one or more paths to reach the destination. The risk analysis server may request data (e.g., a user profile), which are associated with a previously completed trip that corresponds to the trip of the driver, from the telematics device 200. The processor 230 may transmit the data associated with the previously completed trip to the external server 22 (e.g., the risk analysis server). The processor 230 may receive the information about the estimated insurance fee for each of the one or more paths to reach the destination from the external server 22 (e.g., the risk analysis server).

According to embodiments of the present disclosure, the estimated insurance fee may be calculated based on the navigation data, the external environment data, the driver data, and the data associated with the previously completed trip. For example, the driver data may include vehicle data associated with at least a part of a temperature, a voltage, a discharge current, a charge current, or acceleration/braking efficiency. As another example, the driver data may include data on at least a part of an age, a driving experience, a driving experience in each of the one or more paths, or a driving experience in vehicles having the same type as the vehicle. For example, the external environmental data may include information about at least a part of weather or traffic volume. By considering the various factors mentioned above, the insurance fee may be estimated more accurately.

The processor 230 may transmit the estimated insurance fee information to the driver terminal 21. The processor 230 may provide, to the driver terminal 21, the estimated insurance fee information matched to each of the one or more paths to reach the destination. The driver may check the estimated insurance fee based on the path.

When one of the one or more paths for navigating to the destination is selected through the driver terminal 21, the processor 230 may control the vehicle to start the engine. The driver may drive the vehicle along the selected path.

When the trip corresponding to the selected path is completed, the processor 230 may transmit the data associated with the trip to the external server 22 (e.g., the external data processing server and the risk analysis server). The processor 230 may transmit data on an actual driving path, an actual driving distance, a driving pattern, and the like collected during the driving of the driver to the external data processing server and the risk analysis server. The actual insurance fee may be calculated by the external data processing server and the risk analysis server, and the calculated actual insurance fee may be transmitted to the insurance company server.

The processor 230 may receive, from the external server (e.g., an insurance company server), an invoice that includes the actual insurance fee information for the trip. The processor 230 may transmit the invoice to the driver terminal 21.

According to embodiments of the present disclosure, the processor 230 may receive notification of generation of a report including the insurance fee information from the external server 22. The report may be generated monthly and may include total insurance fee information for the corresponding month. The processor 230 may send, to the driver terminal 21, a message informing the preparation of the report. In this case, the driver terminal 21 may be a terminal installed to a vehicle or a terminal of a regular user. The regular user may access the report by using the telematics system profile.

Figure 3:
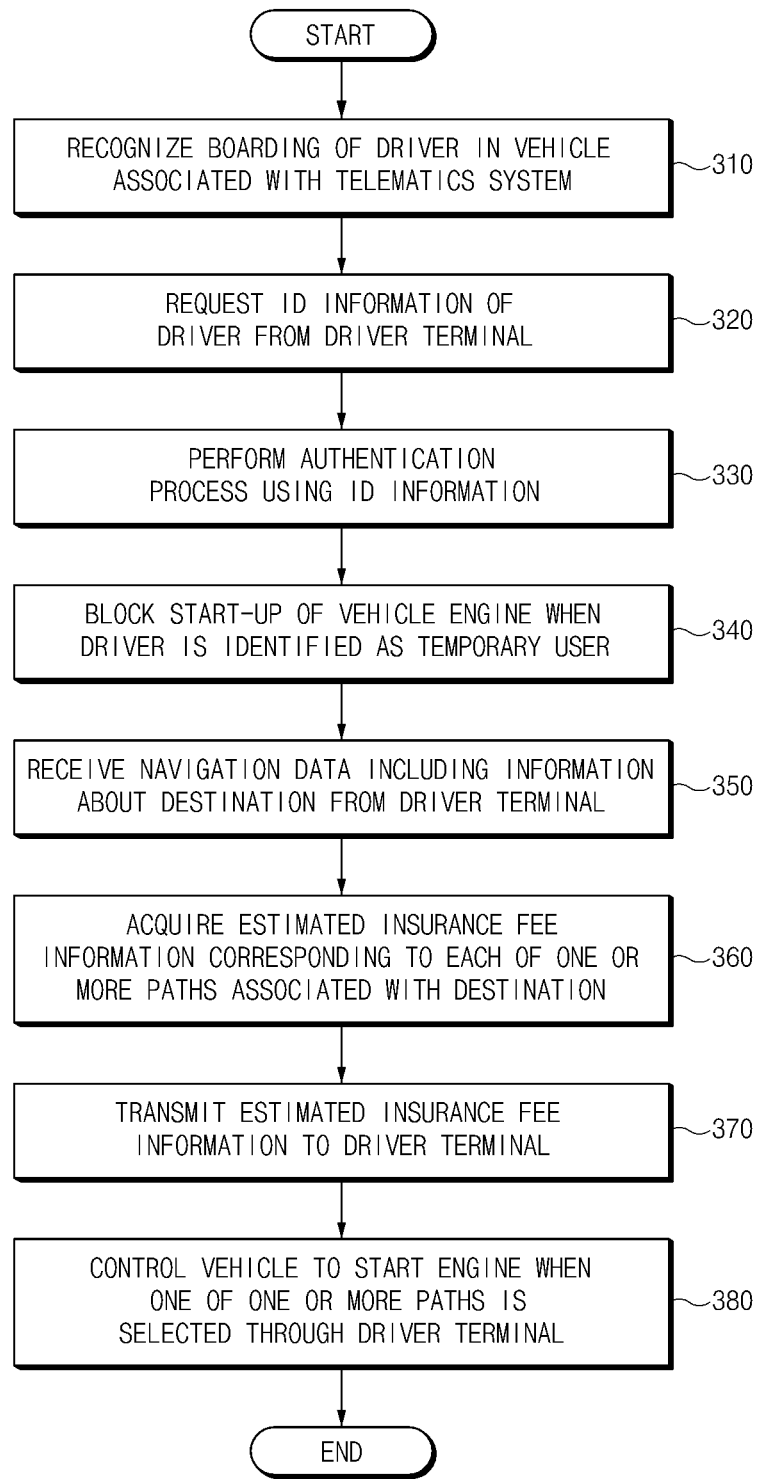
FIG. 3 is a flowchart illustrating a method of taking out insurance and estimating an insurance fee by a telematics system according to embodiments of the present disclosure.

FIG. 3 is a flowchart illustrating a method of taking out insurance and estimating an insurance fee by a telematics system according to embodiments of the present disclosure.

Hereinafter, it is assumed that the telematics device 200 of FIG. 2 performs the process of FIG. 3. In addition, in the description of FIG. 2, it may be understood that the operations described as being performed by the device are controlled by the processor 230 of the telematics device 200.

As shown in FIG. 3, in operation 310, the telematics device may recognize the boarding of a driver in a vehicle associated with the telematics system. For example, the telematics device may recognize the boarding of a driver when an input is applied to an engine start button.

In operation 320, the telematics device may request the ID information of the driver from the driver terminal. For example, the telematics device may request the fingerprint information of the driver.

In operation 330, the telematics device may perform the authentication process by using the ID information. For example, the telematics device may transmit the fingerprint information to the authentication server and receive the authentication result from the authentication server. The authentication server may perform authentication by comparing the received fingerprint information with previously stored fingerprint information.

In operation 340, when the driver is identified as a temporary user, the telematics device may block the start-up of the engine of the vehicle. For example, when the driver is not a regular user but a user registered in the authentication server, the telematics device may determine that the driver is a temporary user. The telematics device may prevent the engine from starting to allow the driver to insure before driving.

In operation 350, the telematics device may receive navigation data including information about the destination from the driver terminal. For example, the telematics device may understand the trip of the driver and obtain information about the trip to estimate a PPM insurance fee.

In operation 360, the telematics device may obtain the estimated insurance fee information corresponding to each of the one or more paths associated with the destination. For example, the telematics device may obtain the estimated insurance fee information corresponding to each of the paths to arrive at the destination. The estimated insurance fee may be calculated by the external server based on navigation data, external environment data, driver data, and data associated with a previously completed trip.

In operation 370, the telematics device may transmit the estimated insurance fee information to the driver terminal. For example, the telematics device may transmit, to the driver terminal, the estimated insurance fee information matched to each of the paths to arrive at the destination.

In operation 380, when one of the one or more paths is selected by the driver terminal, the telematics device may control the vehicle to start the engine. The driver may drive the vehicle after taking out the PPM insurance through the above-described process.

Figure 4:
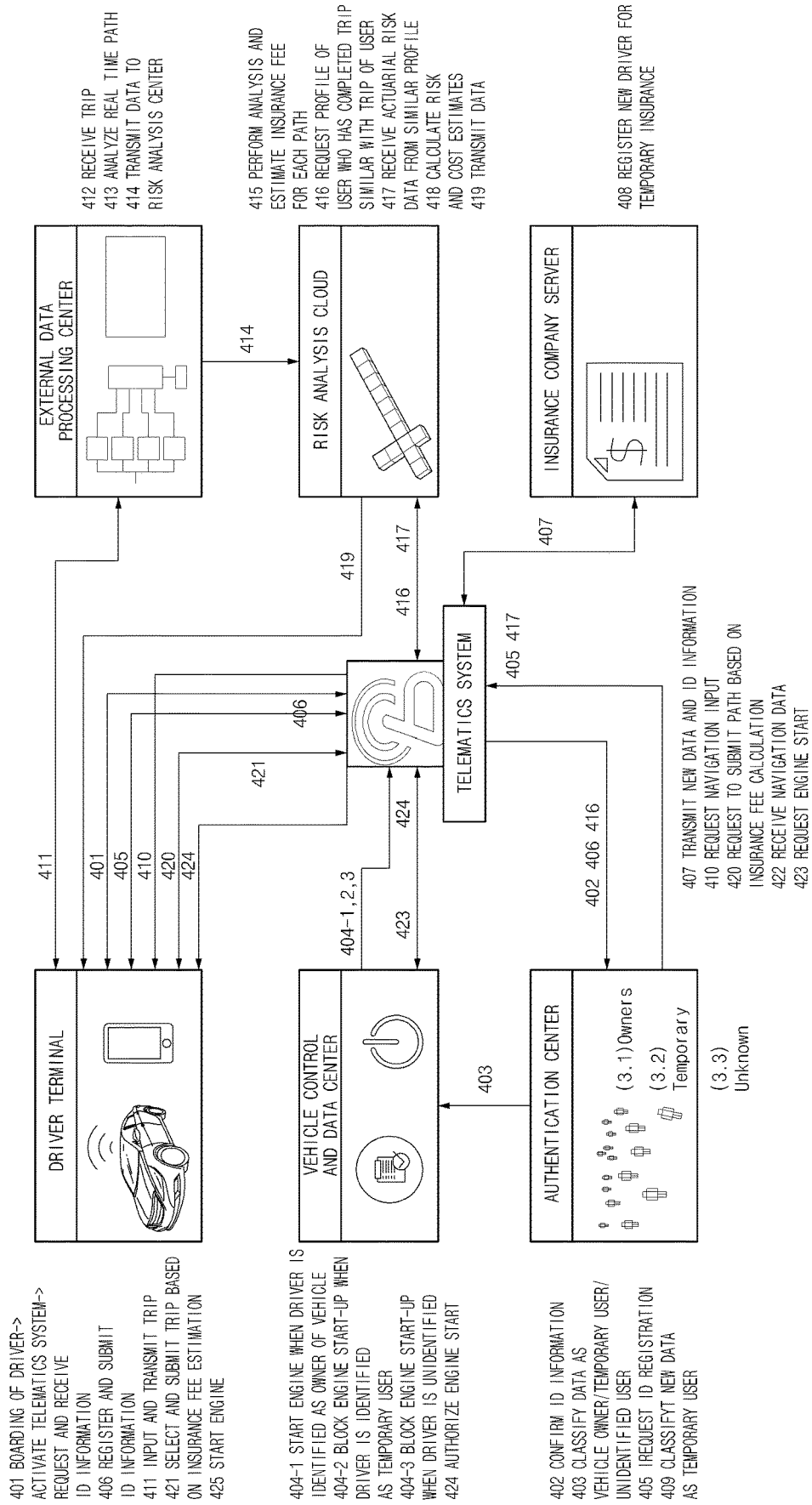
FIG. 4 is a view illustrating an exemplary operation of a telematics system according to embodiments of the present disclosure.

FIG. 4 is a view illustrating an exemplary operation of a telematics system according to embodiments of the present disclosure.

As shown in FIG. 4, in operation 401, the driver terminal may activate the telematics system when the driver boards the vehicle. The driver terminal may request the driver to input the ID information and may receive the ID information from the driver. The driver terminal may obtain information about the driver's license from the driver. The driver terminal may provide the information about the driver's license to the insurance company server directly or through the telematics system.

In operation 402, an authentication center may confirm the ID information. The authentication server may receive the ID information through the telematics system.

In operation 403, the authentication center may classify the data as a vehicle owner (or an insured regular user), a temporary user, or an unidentified user. The authentication center may classify the driver by comparing the received ID information with the ID information stored in the database.

In operation 404-1, a vehicle control and data center may allow the engine to start when the driver is identified as the vehicle owner. In operations 404-2 and 404-3, the vehicle control and data center may block start-up of the engine when the driver is unidentified or identified as a temporary user.

In operation 405, when the driver is unidentified, the authentication center may request the telematics system to register ID. The telematics system may provide a registration form for acquiring user information to the driver terminal.

In operation 406, the driver terminal may register the ID information and submit the ID information and the user information to the telematics system. The telematics system may transmit the ID information and user information to the authentication center.

In operation 407, the telematics system may transmit new data (e.g., user information) and ID information to an insurance company. In operation 408, an insurance company server may register the driver for temporary insurance by using the user information.

In operation 409, the authentication center may classify new data of the unidentified driver as a temporary user. By completing registration, an unidentified user may be treated as a temporary user.

In operation 410, the telematics system may request navigation input from the driver terminal. The telematics system may request the navigation input to allow the driver to input the destination to a navigation application.

In operation 411, when the trip is input by the driver, the driver terminal may transmit data on the trip to an external data processing center. In operation 412, the external data processing center may receive data on the trip from the driver terminal.

In operation 413, the external data processing center may analyze one or more real-time paths corresponding to the received trip. In operation 414, the external data processing center may transmit the analyzed data to a risk analysis center.

In operation 415, a risk analysis cloud may analyze the received data and estimate the insurance fees for each path. In operation 416, the risk analysis cloud may request the profile of another user who is similar with the driver and had taken a trip similar with the trip of the driver from the authentication center through the telematics system. The profile may include, for example, information about driving history, driving habits, and the like. In operation 417, the risk analysis cloud may receive actuarial risk data from a similar profile from the authentication center through the telematics system. In operation 418, the risk analysis cloud may use the received data to calculate risk and cost estimates. In operation 419, the risk analysis cloud may transmit the result data to the driver terminal through the telematics system.

In operation 420, the telematics system may request to submit a path based on the insurance fee calculation. In operation 421, the driver may refer to the estimated insurance fee to select the trip and may submit the selected trip to the telematics system. In operation 422, the telematics system may receive navigation data corresponding to the submitted trip from the driver terminal.

In operation 423, the telematics system may request a vehicle control and data center to start the engine. In operation 424, the vehicle control and data center may authorize the start-up of the engine. In operation 425, the driver terminal may start the engine.

Figure 5:
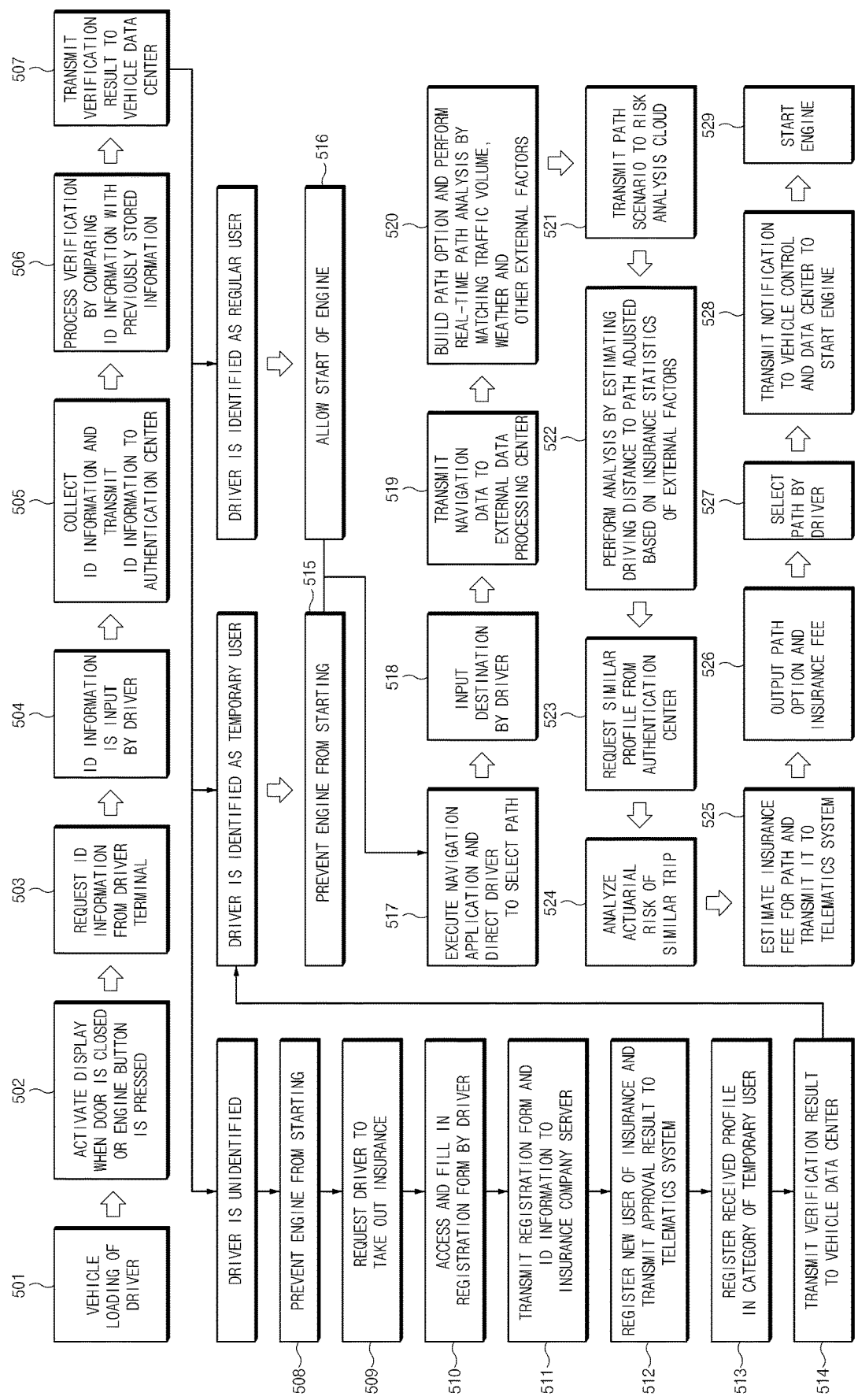
FIG. 5 is a view illustrating an exemplary operation of a telematics system according to embodiments of the present disclosure.

FIG. 5 is a view illustrating an exemplary operation of a telematics system according to embodiments of the present disclosure.

As shown in FIG. 5, in operation 501, a driver may board the vehicle. In operation 502, the driver terminal may activate a display installed to the vehicle if a door of the vehicle is closed or an engine button is pressed.

In operation 503, the telematics system may request ID information from the terminal of the driver. In operation 504, the driver may input the ID information by using the driver terminal. In operation 505, the telematics system may collect the ID information and transmit it to the authentication center. In operation 506, the authentication center may process verification by comparing the received ID information with the previously stored information. In operation 507, the authentication center may transmit the verification result to the vehicle control and data center.

In operation 508, when the driver is unidentified, the vehicle control and data center may prevent the engine from starting. In operation 509, the telematics system may request the driver to take out insurance. In operation 510, the driver may access the registration form and may fill in the registration form by using the driver terminal. In operation 511, the telematics system may transmit the registration form and ID information to the insurance company server. In operation 512, the insurance server may register the new user of the insurance and transmit the approval result to the telematics system. In operation 513, the authentication center may register the received profile in the category of the temporary user. In operation 514, the authentication center may transmit the verification result to the vehicle control and data center.

In operation 515, when the user is identified as a temporary user, the vehicle control and data center may prevent the engine from starting. In operation 516, when the driver is identified as a regular user, the vehicle control and data center may allow start-up of the engine.

In operation 517, the telematics system may execute the navigation application and direct the driver to select a path. In operation 518, the driver may input the destination through the driver terminal. In operation 519, the telematics system may transmit the navigation data to the external data processing center.

In operation 520, the external data processing center may perform real-time path analysis by building path options and matching the path options with traffic volume, weather, and other external factors. In operation 521, the external data processing center may transmit a path scenario to the risk analysis cloud.

In operation 522, the risk analysis cloud may perform the analysis by estimating the driving distance to the path adjusted based on insurance statistics of external factors. In operation 523, the risk analysis cloud may request a similar profile from the authentication center. In operation 524, the risk analysis cloud may analyze the actuarial risk of a similar trip. In operation 525, the risk analysis cloud may estimate the insurance fee for the path and transmit it to the telematics system.

In operation 526, the telematics system may output the path options and insurance fee. In operation 527, the driver may select the path through the driver terminal. In operation 528, the telematics system may transmit notification to the vehicle control and data center to start the engine. In operation 529, the vehicle control and data center may start the engine. The step 528 and 529 may be skipped if the driver is identified as a regular user FIG. 6 is a view illustrating an exemplary operation of a telematics system according to embodiments of the present disclosure.

Figure 6:
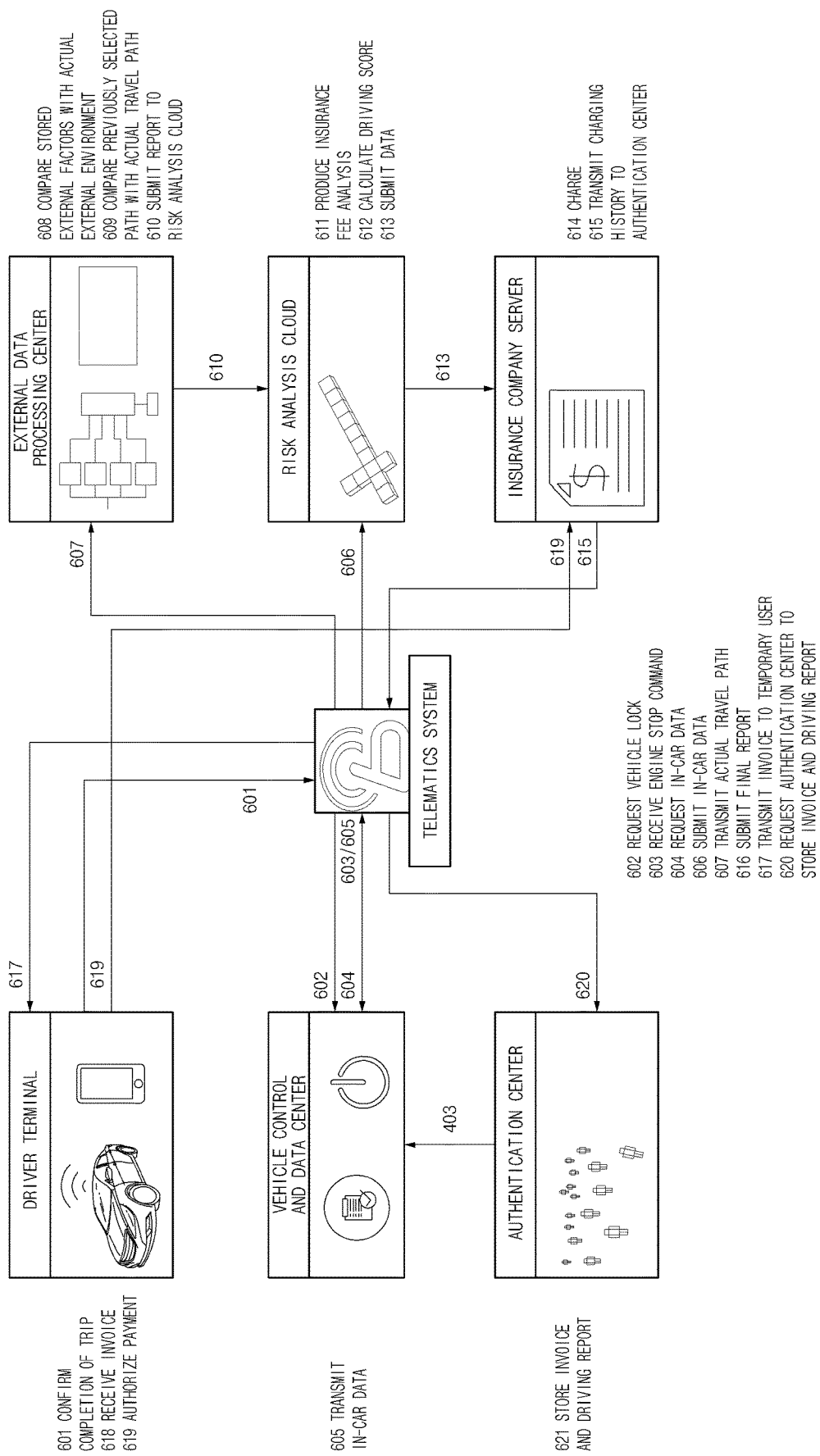
FIG. 6 is a view illustrating an exemplary operation of a telematics system according to embodiments of the present disclosure.

As shown in FIG. 6, in operation 601, the driver terminal may confirm that the trip is completed. For example, when the vehicle arrives at a destination or the operation of the vehicle is terminated, the driver terminal may determine that the trip is completed.

In operation 602, the telematics system may request the vehicle control and data center to lock the vehicle. In operation 603, the telematics system may receive an engine stop command from the vehicle control and data center. The telematics system may request in-car data from the vehicle control and data center. The vehicle control and data center may transmit the in-car data to the telematics system. In operation 606, the telematics system may submit the in-car data to the risk analysis cloud. In operation 607, the telematics system may transmit the actual driving path to the external data processing center.

In operation 608, the external data processing center may compare the stored external factors with the actual external environment during driving. In operation 609, the external data processing center may compare the previously selected path with the actual driving path. In operation 610, the external data processing center may submit a report including the comparison results to the risk analysis cloud.

In operation 611, the risk analysis cloud may produce an insurance fee analysis based on the received information. In operation 612, the risk analysis cloud may calculate a driving score based on the received information. The risk analysis cloud may submit acquired data to the insurance company server.

In operation 614, the insurance company server may transmit the invoice to the telematics system. In operation 615, the insurance company server may transmit the charging history to the authentication center through the telematics system.

In operation 616, the telematics system may submit a final report on the trip. For example, in operation 617, the telematics system may transmit an invoice to the temporary driver. The driver terminal may receive the invoice in operation 618 and may authenticate the payment to the insurance company server in operation 619. In operation 620, the telematics system may request the authentication center to store the invoice and the driving report. The authentication center may store the invoice and the driving report. For example, the driving report may include information about driving history and driving habits (e.g., an acceleration/braking ratio). The driving report may be stored in the profile of the temporary user and may be utilized in calculating the insurance fee of the temporary user later.

Figure 7:
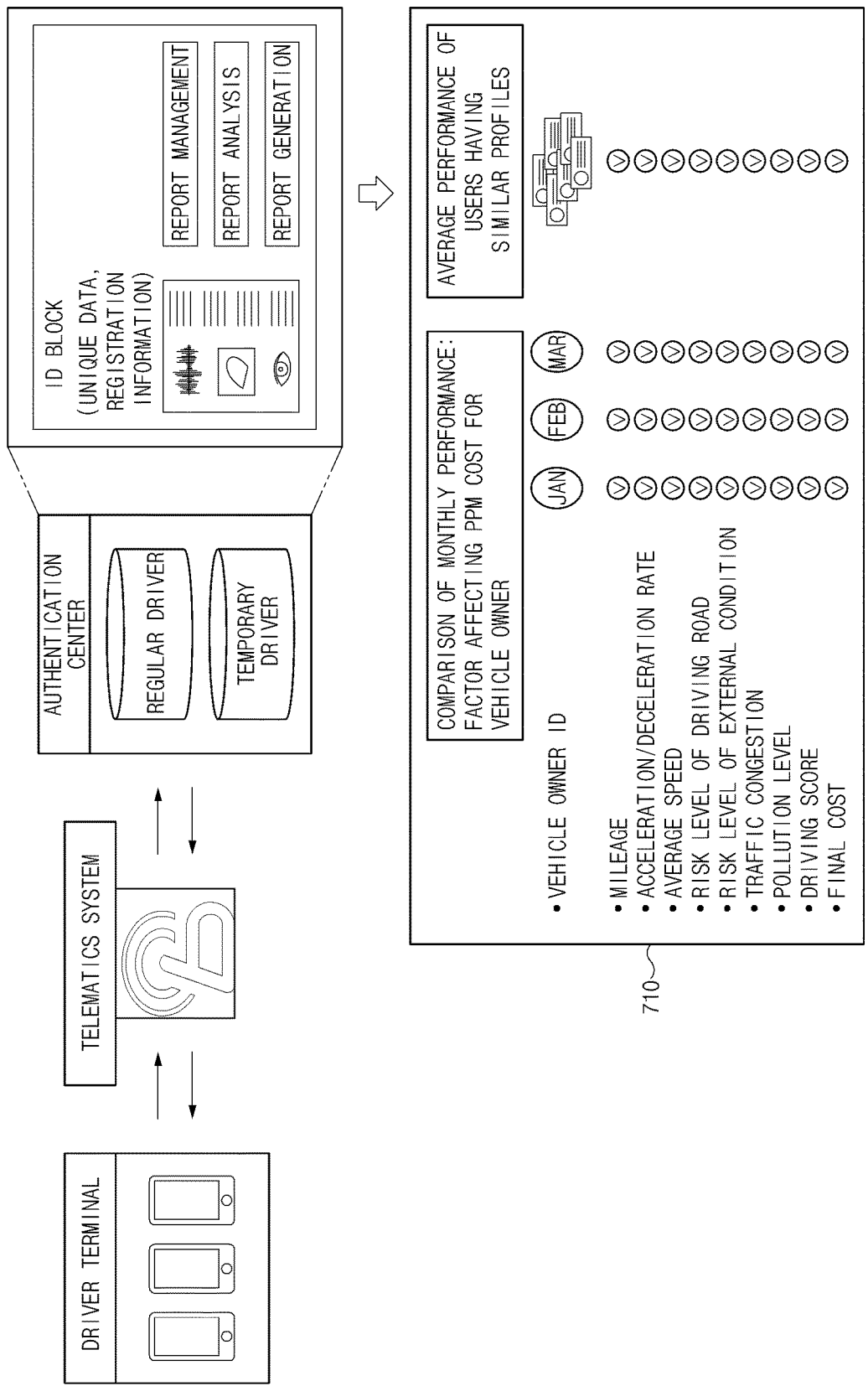
FIG. 7 is a view illustrating an exemplary operation of a telematics system according to embodiments of the present disclosure.

FIG. 7 is a view illustrating an exemplary operation of a telematics system according to embodiments of the present disclosure.

As shown in FIG. 7, the driver terminal may communicate with the authentication center through the telematics system. The authentication center may include a database for regular drivers and a database for temporary drivers. The authentication center may manage, analyze, and generate a report 710 that includes insurance fee information based on unique data and registration information.

The report 710 may include monthly performance and average performance of other users having similar profiles. The report 710 may include an analysis result of a factor that affects an insurance fee. For example, the factor affecting the insurance fee may include a driving mileage, an acceleration/deceleration rate, an average speed, a risk level of a road driven, a risk level of an external condition, traffic congestion, a pollution level, a driving score, and the like. The report 710 may include information about a monthly final cost.

Figure 8:
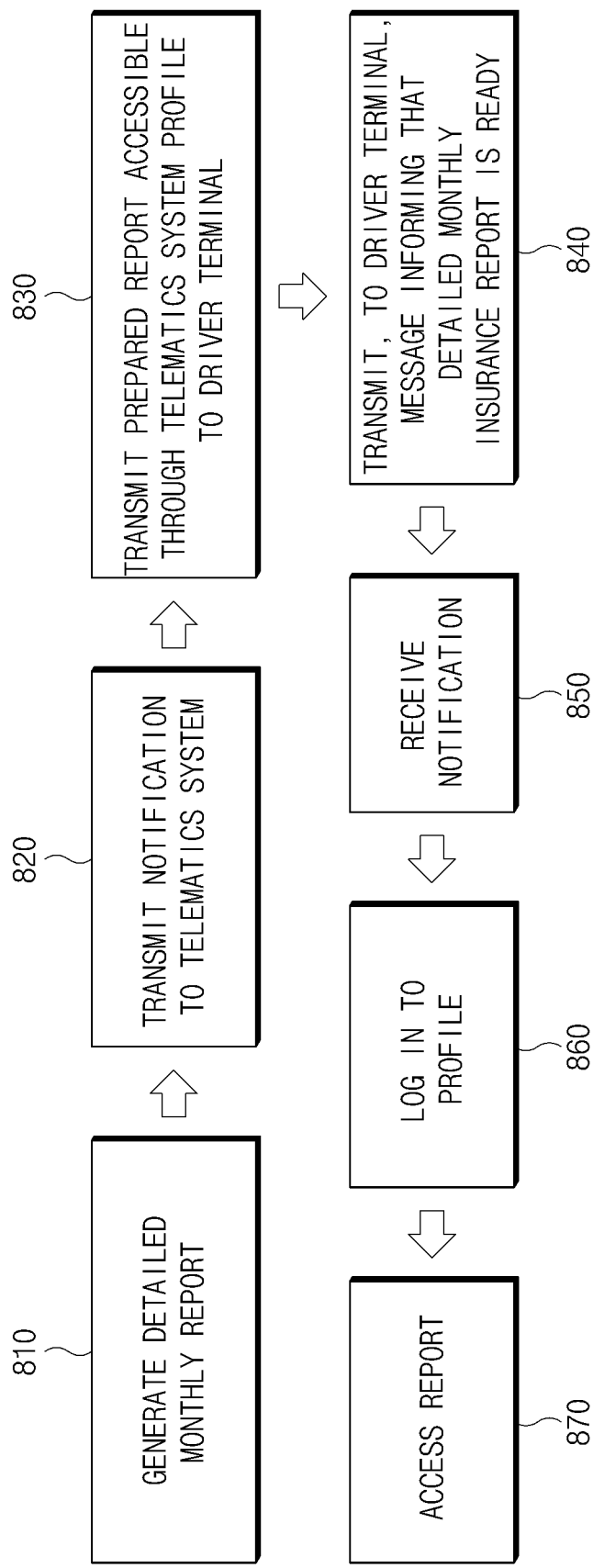
FIG. 8 is a view illustrating an exemplary operation of a telematics system according to embodiments of the present disclosure.

FIG. 8 is a view illustrating an exemplary operation of a telematics system according to embodiments of the present disclosure.

As shown in FIG. 8, in operation 810, the authentication center may generate a detailed monthly report at the end of the month. In operation 820, the authentication center may transmit a report generation notification to the telematics system. In operation 830, the telematics system may transmit a prepared report, which is accessible through a telematics system profile, to the driver terminal. In operation 840, the telematics system may send, to the driver terminal, a message informing that the detailed monthly insurance report is ready. In operation 850, the driver terminal may receive a notification from the telematics system. In operation 860, the driver terminal may log in to the driver's profile. In operation 870, the driver terminal may access the report after logging in.

Figure 9:
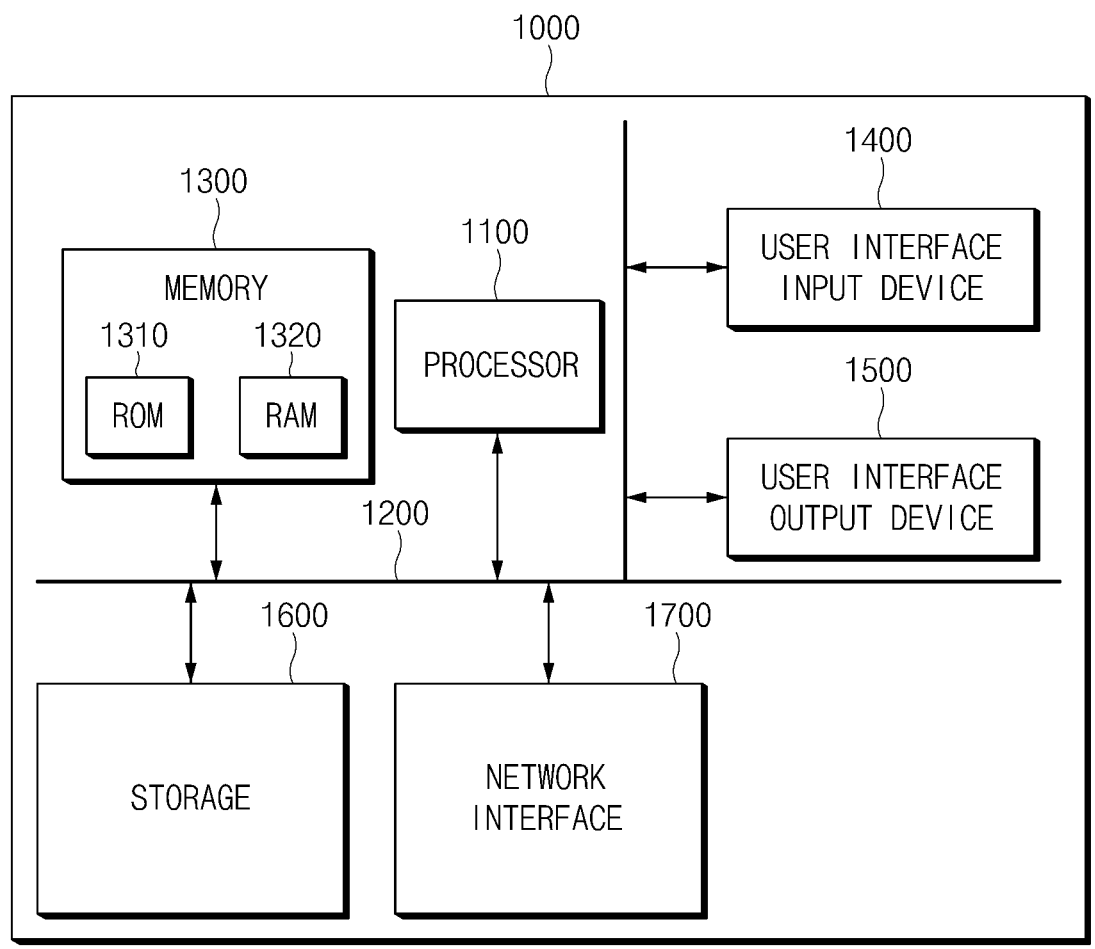
FIG. 9 illustrates a computing system according to embodiments of the present disclosure.

FIG. 9 illustrates a computing system according to embodiments of the present disclosure.

As shown in FIG. 9, as described above, the method according to embodiments of the present disclosure may be implemented through a computing system. A computing system 1000 may include at least one processor 1100, a memory 1300, a user interface input device 1400, a user interface output device 1500, a storage 1600, and a network interface 1700, which are connected through a system bus 1200.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM. The exemplary storage medium is coupled to the processor 1100, and the processor 1100 may read information from the storage medium and may write information in the storage medium.

In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the embodiments of the present disclosure, the telematics device may calculate a reasonable insurance fee based on various factors, facilitate insurance by using telematics technology, and prevent an uninsured driver from driving by controlling the start-up of an engine. In addition, there may be provided various effects that are directly or indirectly understood through the present disclosure.

The above description is a non-limiting demonstration of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A method of operating a telematics device of a vehicle, the method comprising:
requesting identity (ID) information of a driver from a driver terminal in communication with the telematics device when the driver enters the vehicle;
performing an authentication process using the ID information;
controlling operation of the vehicle such that start-up of an engine of the vehicle is prevented when the driver is identified as a temporary user according to the authentication process;
receiving navigation data including information relating to a destination from the driver terminal;
acquiring information indicating an estimated insurance fee corresponding to each of one or more paths for navigating to the destination, wherein the estimated insurance fee is calculated based on the navigation data, external environment data, and driver data;
transmitting the information indicating the estimated insurance fee to the driver terminal; and
controlling operation of the vehicle such that the engine is started when one of the one or more paths for navigating to the destination is selected by the driver terminal.

2. The method of claim 1, wherein the requesting of the ID information comprises:
detecting whether a door of the vehicle is closed, a hand of the driver touches a steering wheel of the vehicle, or a start button of the vehicle is pressed; and
requesting the ID information upon detecting that the door of the vehicle is closed, the hand of the driver touches the steering wheel of the vehicle, or the start button of the vehicle is pressed.

3. The method of claim 1, wherein the driver terminal includes at least one of a terminal installed in the vehicle and a mobile terminal of the driver.

4. The method of claim 1, further comprising:
receiving the ID information from the driver terminal,
wherein the ID information includes at least one of fingerprint information of the driver, facial information of the driver, and voice information of the driver.

5. The method of claim 1, further comprising:
performing a process of registering the driver using a registration form and the ID information when the driver is unidentified according to the authentication process.

6. The method of claim 5, further comprising:
when the unidentified driver is registered, identifying the registered driver as the temporary user.

7. The method of claim 1, further comprising:
controlling operation of the vehicle such that the engine starts when the driver is identified as a regular user according to the authentication process.

8. The method of claim 1, further comprising:
requesting the navigation data from the driver terminal after preventing the start-up of the engine.

9. The method of claim 1, wherein the acquiring of the information indicating the estimated insurance fee comprises:
transmitting the navigation data to an external server;
transmitting data associated with a previously completed trip of the driver to the external server; and
receiving the information indicating the estimated insurance fee from the external server,
wherein the information indicating the estimated insurance fee is calculated based on the navigation data, the external environment data, the driver data, and based further on the data associated with the previously completed trip of the driver.

10. The method of claim 1, wherein the driver data includes vehicle data associated with at least one of a temperature, a voltage, a discharge current, a charge current, and acceleration/braking efficiency.

11. The method of claim 1, wherein the driver data includes data relating to at least one of an age, a driving experience, a driving experience in each of the one or more paths for navigating to the destination, and a driving experience in vehicles of the same type as the vehicle.

12. The method of claim 1, wherein the external environment data includes information relating to at least one of weather and traffic volume.

13. The method of claim 1, further comprising:
when a trip corresponding to the selected path is completed, transmitting data associated with the trip to an external server;
receiving an invoice including insurance fee information for the trip from the external server; and
transmitting the invoice to the driver terminal.

14. The method of claim 13, further comprising:
receiving a notification of generation of a report including the insurance fee information from the external server; and
transmitting a message indicating that the report has been prepared to the driver terminal.

15. The method of claim 14, wherein the report is accessible using a telematics system profile.

16. A telematics device of a vehicle, the telematics device comprising:
a communication circuit configured to communicate with a driver terminal and an external server;
a memory configured to store program instructions; and
a processor electrically connected to the communication circuit and the memory, the processor configured to execute the stored program instructions, which when executed cause the processor to:
request identity (ID) information of a driver from the driver terminal when the driver enters the vehicle,
perform an authentication process using the ID information,
control operation of the vehicle such that start-up of an engine of the vehicle is prevented when the driver is identified as a temporary user according to the authentication process,
receive navigation data including information relating to a destination from the driver terminal,
acquire information indicating an estimated insurance fee corresponding to each of one or more paths for navigating to the destination, wherein the estimated insurance fee is calculated based on the navigation data, external environment data, and driver data,
transmit the information indicating the estimated insurance fee to the driver terminal, and
control operation of the vehicle such that the engine is started when one of the one or more paths for navigating to the destination is selected by the driver terminal.

17. The telematics device of claim 16, wherein the processor
detects whether a door of the vehicle is closed, a hand of the driver touches a steering wheel of the vehicle, or a start button of the vehicle is pressed, and
requests the ID information upon detecting that the door of the vehicle is closed, the hand of the driver touches the steering wheel of the vehicle, or the start button of the vehicle is pressed.

18. The telematics device of claim 16, wherein the processor
performs a process of registering the driver using a registration form and the ID information when the driver is unidentified according to the authentication process, and
when the unidentified driver is registered, identifies the registered driver as the temporary user.

19. The telematics device of claim 16, wherein the processor
transmits the navigation data to an external server,
transmits data associated with a previously completed trip of the driver to the external server, and
receives the estimated insurance fee from the external server,
wherein the estimated insurance fee is calculated based on the navigation data, the external environment data, the driver data, and the data associated with the previously completed trip of the driver.

20. The telematics device of claim 16, wherein the external server includes at least one of an authentication server, a vehicle control and data storage server, an external data processing server, a risk analysis server, and an insurance company server.

* * * * *